United States Patent [19]

Phillips et al.

[11] Patent Number: 5,814,245
[45] Date of Patent: Sep. 29, 1998

[54] FLUORESCENT AND CATHODOLUMINESCENT PHOPHORS STRUCTURALLY RELATED TO SODALITE

[75] Inventors: Mark L. F. Phillips, Tijeras, N. Mex.; Lauren E. Shea, San Diego, Calif.

[73] Assignee: Sandia Corporation, Albuquerque, N. Mex.

[21] Appl. No.: 827,146

[22] Filed: Mar. 27, 1997

[51] Int. Cl.[6] ........................... C09K 11/64; C09K 11/56; C09K 11/66; C09K 11/55
[52] U.S. Cl. ..................... 252/301.45; 423/117; 423/518
[58] Field of Search ................... 423/117, 508, 423/518; 252/301.45, 301.65

[56] References Cited

PUBLICATIONS

Chemical Abstract citation 118:51125, Brenchley et al., "Synthesis and Structure of Sulfide Aluminate Sodalites", J. Mater. Chem., vol. 2 (10), pp. 1003–1005, 1992.
Chemical Abstract citation 125:315072, Dann et al., "The Structure of Strontium Tellurite and Strontium Telluride Aluminate Sodalites Studied by Powder Neutron Diffraction, EXAFS, IR and MAS NMR Spectroscopies". J. Mater. Chem., vol. 6 (10), pp. 1717–21, 1996.

Brenchley et al., "Structure of Strontium Selenite and Strontium Selenide Aluminate Sodalities and the Relationship of Framework Structure to Vibrational Spectra in Aluminate Sodalites", Chem. Mater., vol. 5, pp. 970–973, Jul. 1993.

Blasse et al., "Luminescence of Zn4X and Cd4X Clusters (X=S,Se) in an Aluminate or Borate Cage", Chem. Phys. Lett., vol. 234, pp. 177–181, Mar. 3, 1995.

*Primary Examiner*—Melissa Bonner
*Attorney, Agent, or Firm*—Elmer A. Klavetter

[57] ABSTRACT

Blue, quantum-confined phosphors for field-emission displays made by reducing metal (M) sulfoaluminates at high temperature. This yields phases of the type $M_4(AlO_2)_6S$. Bulk sulfide contaminant mixed with the reduced sulfoaluminate phase is removed by treating it with a chelating agent in nonaqueous solution. A photometric cathodoluminescence efficiency of 9 lumen/watt at 1000 V for $Sr_3PbS(AlO_2)_6$ is observed. Undoped $Sr_4S(AlO)_6$ displays 5 lumen/watt at 1000 V, with excellent blue chromatic saturation.

9 Claims, 2 Drawing Sheets

FLUORESCENT AND CATHODOLUMINESCENT PHOPHORS STRUCTURALLY RELATED TO SODALITE

This invention was made with Government support under Contract No. DE-AC04-94AL85000 awarded by the United States Department of Energy. The Government has certain rights in the invention.

BACKGROUND OF THE INVENTION

Field emission displays (FEDs) are expected to make up a significant segment of the flat-panel display market. One of the technical factors limiting the acceptance of FEDs is high power consumption. This is due largely to low efficiency of the phosphors used to convert electron energy to visible light. In particular, there is a need for a blue phosphor with good color saturation and an efficiency in the 500–1000 V range of at least one lm/W (lumen/watt).

Chalcogenide phosphors such as ZnS:Ag and SrS:Ce marginally meet the efficiency requirement, but can react with moisture in the presence of the electron beam to produce corrosive gas products. There exists a clear need for a blue phosphor with increased photometric efficiency and environmental stability in a FED. Encapsulating or intercalating chalcogenide phosphors in inert oxide matrices at the molecular level should render the materials air stable, thereby enhancing processability and increasing the useful life of the displays. This molecular encapsulation should also induce a "quantum-size" effect that alters the electronic structure of the intercalated species from that of the corresponding bulk phosphor. This effect should increase the luminescence efficiency and decrease the power requirements of the display.

SUMMARY OF THE INVENTION

It is an object of this invention to provide a method for making blue-color phosphors.

A further object of this invention is to achieve a phosphor of good color saturation.

A still further object of this invention is to achieve a phosphor of high luminescence efficiency in the range of about 500 to about 1000 V.

A still further object of this invention is to achieve a phosphor with a low power requirement.

A still further object of this invention is to achieve a phosphor with acceptable stability in air.

These and other objects may be accomplished by chemically reducing a metal sulfoaluminate in a reducing gas at high temperature, removing bulk metal sulfide contaminants from the reduced metal sulfoaluminate with a chelating agent in a solvent, removing the chelating agent and solvent by filtration, washing with a non-aqueous solvent, and drying the resulting phosphor product.

DETAILED DESCRIPTION OF THE INVENTION

Figure 1:
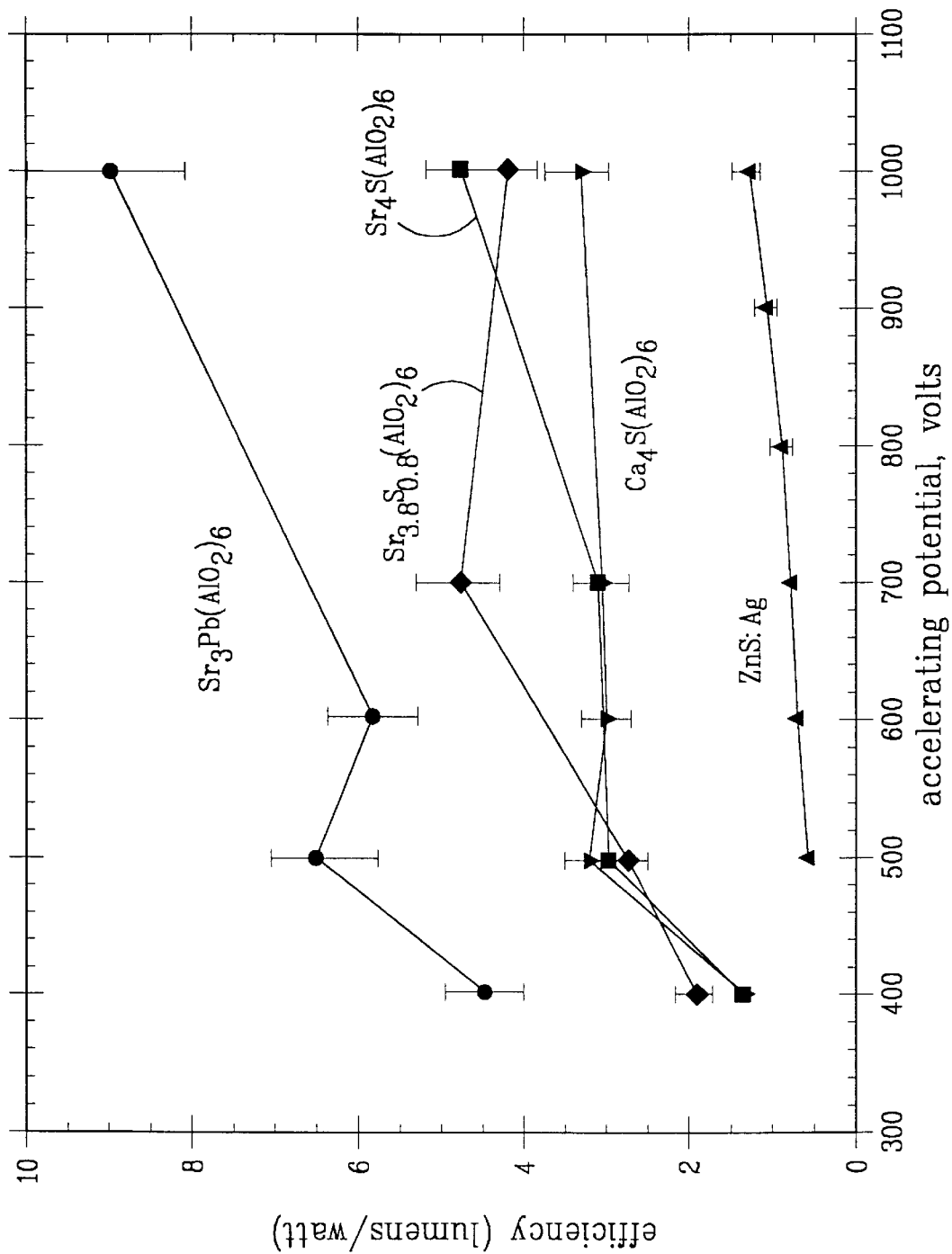
FIG. 1. Cathodoluminescence of metal-sulfide cleaned, reduced sulfoaluminates.

The phosphors of the present invention consist of five-atom clusters of divalent metal chalcogenides (e.g., CaS, SrS, SrSe, CdS, CdTe, and PbS) isolated by aluminum oxide cages, with a structure similar to that of the mineral sodalite ($3Na_2O.3Al_2O_3. 6SiO_2. 2NaCl$). The very small cluster size causes the normally continuous electronic bands to split into discrete states, and increases the band gap. This size quantization is believed to enhance the probability of radiative transition, and thus to increase luminous efficiency.

The phosphors of the present invention have the general formula $(M,M')_{(4-x)}X_{(1-x)}(AlO_2)_6$ in which either M is Ca or Sr and M' is Pb, where the M:M' ratio is 3:1, X is S and x is 0 or in which M is Sr, M' is not present, X is S and x is 0.2.

These phosphors are synthesized by firing mixtures of the constituent oxides or their precursors (e.g., carbonates, nitrates, oxalates, hydroxides, or cyanides) with a source of chalcogenate ion(s) (for example, $SO_4^{-2}$), or chalcogenite ion(s) (e.g., $SeO_3^{-2}$). The chalcogenate ion(s) may be included with one of the metals or added separately, e.g., as $(NH_4)_2SO_4$.

Firing is done in a suitably inert vessel (e.g., Pt or $Al_2O_3$) at a temperature from about 1000° to about 1500° C. in air or an inert gas, at atmosphere pressure or in a sealed tube, until a single phase with the formula $(M,M')_{(4-x)}(XO_4)_{(1-x)}(AlO_2)_6$ is obtained. This product is then heated at about 600° to about 1000° C. in a reducing atmosphere of $H_2$, $H_2S$, $H_2Se$, $H_2Te$, or CO, singly or in combination, or together with $N_2$ or Ar, until a crude product containing $(M,M')_{(4-x)}X_{(1-x)}(AlO_2)_6$ as a major phase results.

Alternately, these phosphors may be synthesized by firing mixtures of the constituent oxides or their precursors (e.g., carbonates, nitrates, oxalates, hydroxides, and cyanides) with a source of chalcogenide ion (for example $S^{-2}$). The chalcogenide ion(s) may be included with one of the metals or added separately, e.g., as $H_2S$. Firing is done in a suitably inert vessel at a temperature from about 800° to about 1400° C. in vacuum, or an inert, reducing, or $H_2X$ atmosphere, or in a sealed tube until a crude product containing $(M,M')_{(4-x)}X_{(1-x)}(AlO_2)_6$ as the major phase results.

The crude product is cleaned of any adherent bulk-metal chalcogenide impurity by immersing it in a solution of a chelating agent that can complex and dissolve the metal ion in the presence of the chalcogenide ion(s). This solution contains a solvent (where the solvent is at least one of the group of N-methyl formamide, formamide, methanol, ethanol, and acetonitrile) in which the phosphor is stable. Alternately, the metal chalcogenide impurity can be treated with an acidic or oxidizing solution that will dissolve it without chemically altering the phosphor product. Once the cleaning process is complete, the phosphor is recovered by filtration, washed with a compatible solvent, and dried and stored in vacuum or in a compatible atmosphere. If the dried phosphor product is insufficiently pure, as determined, for example, by x-ray diffraction, it may be treated again in chelating agent solution, recovered by filtration, washed with a compatible solvent, and dried.

More particularly, in the present invention these "quantum-confined" phosphors are made by reducing metal sulfoaluminates, $M''_4(AlO_2)_6SO_4$ (M''=Ca, Sr, Cd, or Pb; a subset of M and/or M') in a stream of hydrogen gas at a temperature from about 600° to about 1000° C. This yields reduced sulfoaluminate (RSA) phases with the empirical formula $M''_4(AlO_2)_6S$. The process also produces a small amount of bulk sulfide, MS, that is mixed with the RSA. It is essential to eliminate this contaminant MS phase if the FED-friendly properties (high efficiency and environmental stability) of the RSA are to be realized. This cleanup is accomplished by treating the crude RSA with a chelating agent in a nonaqueous solvent. The chelating agent used successfully in the present invention is tetrakis (triethanolammonium) EDTA in formamide, though other agents such as [2.2.1] cryptand, and organic amine salts of EDTA and nitrilotriacetic acid work as well.

Figure 2:
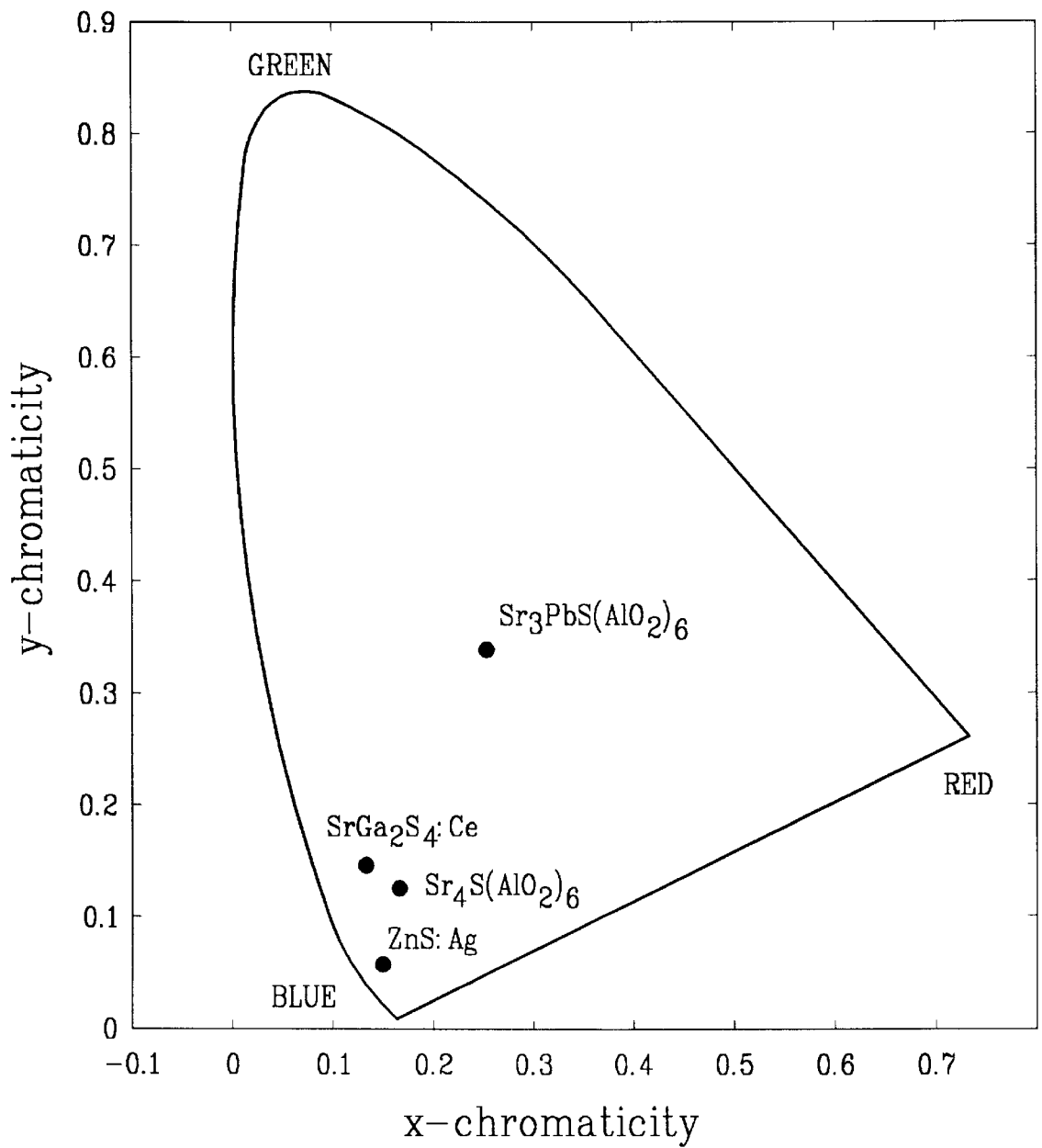
FIG. 2. Chromaticity for cathodoluminescent emission of $Sr_4S(AlO_2)_6$, $SrGa_2S_4$:Ce, $Sr_3PbS(AlO_2)_6$, and ZnS:Ag.

All of the RSAs synthesized by the method of the present invention are blue phosphors, though with variations in chromaticity. This is fortuitous, for the blue component of a screen is the critical color (of red, green, and blue) for FEDs due to the low efficiencies and/or poor chromaticities of commercial blue phosphors. Some comparative cathodoluminescence (CL) efficiency data are shown in FIG. 1. The minimum photometric CL efficiency that will permit FEDs to compete with active-matrix, liquid-crystal display screens on a power consumption basis is one lumen per watt (lm/W) compared with 9 lm/W observed in $Sr_3PbS(AlO_2)_6$ of the present invention, the emission being bluish-white. Undoped $Sr_4S(AlO_2)_6$ displays 5 lm/W at 1000 V, with excellent blue chromatic saturation. Both this efficiency and chromaticity are better than those measured by the Phosphor Technology Center of Excellence for $SrGa_2S_4$:Ce, considered by PTCOE to be among the best of the blue phosphors for FED use (FIG. 2).

Preparation

The present invention teaches a method for making blue, quantum-confined phosphors for field-emission displays by reducing metal (M) sulfoaluminates in a stream of hydrogen gas at a temperature from about 600° to about 1000° C., which yields phases with the empirical formula $M_4(AlO_2)_6S$. The process also produces a small amount of bulk sulfide contaminant that is mixed with the RSA. This contaminant is eliminated by treating the crude RSA with a chelating agent in a nonaqueous solvent. The chelating agent ([2.2.1] cryptand, the salt of nitrilotriacetic acid with triethanolamine or cyclohexylamine, or the salt of ethylenedinitriloacetic acid with triethanolamine or cyclohexylamine) and solvent are removed by filtration and washing with a non-aqueous solvent, and the RSA is dried.

EXAMPLES

1. $Sr_4S(AlO_2)_6$ 8.47 g $Sr(NO_3)_2$ (40 mmol), 1.32 g $(NH_4)_2SO_4$ (10 mmol), and 3.06 g γ-$Al_2O_3$ (30 mmol) are ground together, heated in a Pt crucible at 1000° C. for 12 h, cooled to room temperature, and reheated to 1200° C. for 20 h. The resulting intermediate product, strontium sulfoaluminate $(Sr_4(AlO_2)_4SO_4)$, is reground and then reduced in flowing hydrogen at about 800° C. for about 6 h. SrS impurity is removed from the product, $Sr_4S(AlO_2)_6$, by stirring the product in a chelating solution that is 0.1M in (ethylenedinitrilo)tetra-acetic acid and 0.4M in triethanolamine ($TEA_4Y$) in formamide for 2 h. The purified product is recovered by suction filtration, washed with methanol, dried in vacuum, and stored under a non-reactive atmosphere (dry $N_2$ or Ar) until ready for use.

2. $Sr_3PbS(AlO_2)_6$ 6.35 g $Sr(NO_3)_2$ (30 mmol), 2.23 g PbO (10 mmol), 1.32 g $(NH_4)_2SO_4$ (10 mmol), and 3.06 g γ-$Al_2O_3$ (30 mmol) are ground together, heated in a Pt crucible at 1000° C. for 12 h, cooled to room temperature, reground, and reheated to 1200° C. for 20 h. The resulting intermediate product, strontium lead sulfoaluminate, $(Sr_3Pb(AlO_2)_4SO_4)$, is reground and then reduced in flowing hydrogen at about 800° C. for 6 h. Bulk sulfides are removed from the product, $Sr_3PbS(AlO_2)_6$, by stirring it in a chelating solution that is 0.1M in (ethylenedinitrilo)tetra-acetic acid and 0.4M in triethanolamine ($TEA_4Y$) in formamide for 2 h. The purified product is recovered by suction filtration, washed with methanol, dried in vacuum, and stored under an inert atmosphere (dry $N_2$ or Ar) until ready for use.

3. $Ca_4S(AlO_2)_6$

Preparation is the same as for (1) except for the substitution of 4.00 g $CaCO_3$ (40 mmol) for $Sr(NO_3)_2$.

4. $Ca_3PbS(AlO_2)_6$

Preparation is the same as for (2) except for the substitution of 3.00 g $CaCO_3$ (30 mmol) for the $Sr(NO_3)_2$.

5. $Sr_{3.8}S_{0.8}(AlO_2)_6$

Preparation is the same as for (1) except that 8.04 g $Sr(NO_3)_2$ (38 mmol) and 1.06 g $(NH_4)_2SO_4$ (8 mmol) are used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of making blue-color phosphor of the form $M_3PbS(AlO_2)_6$, having stability in air, comprising:

heating a mixture of a compound containing the metal M, a lead compound, an aluminum compound, and ammonium sulfate to form a metal sulfoaluminate wherein M is strontium or calcium; and chemically reducing the metal sulfoaluminate in a reducing gas at temperatures from about 600° C. to about 1000° C. to form the blue-phosphor $M_3PbS(AlO_2)_6$ product.

2. The method of claim 1 wherein the reducing gas consists of at least one of the group of $H_2$, $H_2S$, $H_2Se$, $H_2Te$, and CO, with or without $N_2$ or Ar.

3. The method of claim 1, further comprising the steps of:

removing from the blue-phosphor $M_3PbS(AlO_2)_6$ product bulk metal sulfide contaminants with a chelating agent in a solvent; and removing the chelating agent and solvent by filtration, washing with a non-aqueous solvent, and drying.

4. The method of claim 3 wherein the chelating agent comprises one of the group of cryptand, the salt of nitrilotriacetic acid with triethanolamine or cyclohexylamine, and the salt of ethylenedinitriloacetic acid with triethanolamine or cyclohexylamine.

5. The method of claim 3 wherein the solvent comprises at least one of the group of N-methyl formamide, formamide, methanol, ethanol, and acetonitrile.

6. The phosphor product $Sr_3PbS(AlO_2)_6$ made by the method of claim 1.

7. The phosphor product $Ca_3PbS(AlO_2)_6$ made by the method of claim 1.

8. A method of making the blue-color phosphor $Sr_{3.8}S_{0.8}(AlO_2)_6$, having stability in air, comprising:

heating a mixture of a strontium compound, an aluminum compound, and ammonium sulfate to form a metal sulfoaluminate; and chemically reducing the metal sulfoaluminate in a reducing gas at temperatures from about 600° C. to about 1000° C. to form the blue-phosphor $Sr_{3.8}S_{0.8}(AlO_2)_6$ product.

9. The phosphor product $Sr_{3.8}S_{0.8}(AlO_2)_6$ made by the method of claim 8.

* * * * *